(12) United States Patent
Ma (10) Patent No.: US 10,134,182 B1
(45) Date of Patent: Nov. 20, 2018

(54) LARGE SCALE DENSE MAPPING (71) Applicant: Zoox, Inc., Menlo Park, CA (US)

(72) Inventor: Lu Ma, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 10 days.

(21) Appl. No.: 15/191,393

(22) Filed: Jun. 23, 2016

(51) Int. Cl.
| | | |
|---|---|---|
| *G09G 5/00* | (2006.01) | |
| *G06T 17/05* | (2011.01) | |
| *G06T 19/20* | (2011.01) | |
| *G06T 1/60* | (2006.01) | |
| *G06T 15/00* | (2011.01) | |
| *G01S 17/89* | (2006.01) | |

(52) U.S. Cl.
CPC .............. *G06T 17/05* (2013.01); *G01S 17/89* (2013.01); *G06T 1/60* (2013.01); *G06T 15/005* (2013.01); *G06T 19/20* (2013.01)

(58) Field of Classification Search
CPC ......... G06T 17/05; G06T 1/60; G06T 15/005; G06T 19/20; G01S 17/89
USPC ........ 345/418, 419, 619, 629, 631, 634, 639
See application file for complete search history.

(56) References Cited

U.S. PATENT DOCUMENTS

| | | | | |
|---|---|---|---|---|
| 8,072,581 B1* | 12/2011 | Breiholz | ................... | G01S 7/51 |
| | | | | 356/4.01 |
| 2007/0153585 A1* | 7/2007 | Blum | ................... | G06F 12/0246 |
| | | | | 365/185.24 |
| 2012/0162237 A1* | 6/2012 | Chung | ................... | G09G 5/001 |
| | | | | 345/532 |
| 2012/0194516 A1* | 8/2012 | Newcombe | ............. | G06T 17/00 |
| | | | | 345/420 |
| 2014/0306959 A1* | 10/2014 | Ozdas | ..................... | G06T 15/06 |
| | | | | 345/424 |
| 2015/0024337 A1* | 1/2015 | Blassnig | ................. | G06T 15/06 |
| | | | | 433/29 |
| 2017/0301249 A1* | 10/2017 | Kunzi | .................. | G05D 1/0088 |

OTHER PUBLICATIONS

Nießner, M., Zollhöfer, M., Izadi, S., & Stamminger, M. (2013). "Real-time 3D Reconstruction at Scale Using Voxel Hashing", ACM Transactions on Graphics (TOG), 32(6), 169, pp. 1-11.*

(Continued)

*Primary Examiner* — Sarah Lhymn
(74) *Attorney, Agent, or Firm* — Lee & Hayes, PLLC (57) ABSTRACT

A large scale dense mapping technique utilizes range data that identifies points in three dimensions. The large scale dense mapping technique utilizes the range data obtained from range sensors coupled with a depth integration technique. After dividing the world, or a portion of the world, into cells and voxels, a mapping system collects range data for a portion of the environment. To speed up the processing involving the large number range measurements, Graphics Processing Unit (GPU) memory, can be used to store data relating to the mapping of the environment. Instead of storing all of the cells of volumetric representation in the memory, just the portion of the cells associated with the range data are stored within the memory. The mapping system can use an SDF or a TSDF based volumetric representation format to represent the environment. The SDF or TSDF based volumetric representation is updated using the range data.

20 Claims, 7 Drawing Sheets

(56) References Cited

OTHER PUBLICATIONS

May, S., Koch, P., Koch, R., Merkl, C., Pfitzner, C., & Nüchter, A. (2014). "A Generalized 2D and 3D Multi-Sensor Data Integration Approach based on Signed Distance Functions for Multi-Modal Robotic Mapping", In VMV (pp. 95-102).*

Ma et al., "Large Scale Dense Visual Inertial SLAM," Mar. 16, 2016, Springer Tracts in Advanced Robots, (STAR, vol. 113), 14 pages.

Ma, "Scalable Unsupervised Dense Objects Discover, Detection, Tracking and Reconstruction," A thesis submitted to the Faculty of the Graduate School of the University of Colorado in partial fulfillment of the requirements for the degree of Doctor of Philosophy Department of Computer Science, 2016, 161 pages.

Ma et al., "Simultaneous Localization, Mapping, and Manipulation for Unsupervised Object Discovery," Nov. 4, 2014, 8 pages.

* cited by examiner

LARGE SCALE DENSE MAPPING

BACKGROUND

Different techniques are used to map environments using data obtained from sensors, such as cameras or time-of-flight sensors. Large scale mapping that maps large areas, however, can be difficult. Large scale mapping may use a technique that maps the world sparsely with points. These point based approaches, however, capture the world sparsely which can lead to complicated strategies needed for generating maps. While some mapping techniques have been developed to densely map small areas, these techniques do not extend to large areas.

DETAILED DESCRIPTION

The following detailed description is directed to technologies for large scale dense mapping. Unlike mapping techniques that use a 2.5D dense depth image including two dimensional images and associated camera matrices, a large scale dense mapping technique is described herein that utilizes range data that identifies points in three dimensions. The large scale dense mapping technique utilizes the data obtained from range sensors coupled with a depth integration technique without the use of camera matrices.

Some mapping techniques use a large amount of memory to store the mapping data associated with an environment. These mapping techniques, however, do not generalize to using data from range sensors that provide range data that identify points in three dimensions, such as laser range data (e.g. laser data, 100 meters in range). Laser range data, however, can provide useful data to assist in both mapping an environment as well as navigating an environment. For example, laser range data may be utilized by an autonomous vehicle as it travels through an environment. The sparse nature of laser range data, however, is not suitable for mapping techniques that utilize a 2.5D dense depth image and associated camera matrices.

The range data used in the large scale dense mapping technique described herein can be obtained from sensors of the same type or from different types of sensors, such as stereo cameras, depth cameras, infrared sensors, photoelectric sensors, ultrasonic sensors, and the like. In some configurations, the range data is obtained from light detection and ranging (LIDAR) sensors that are mounted at various locations on a vehicle (e.g., along the sides and at corners, or at other locations). Generally, LIDAR sensors can generate a large amount of range measurements within a short amount of time (e.g., 1000-100000 range measurements every 0.1 seconds). When more than one sensor is used, the amount of range data generated becomes very large.

In addition to generating a large amount of range data, the range data can include many different range measurements to the same point in the environment. For example, the same range sensor can detect the same point at different points in time. A different sensor can also obtain range measurements for the same point that another sensor has also sensed. Instead of storing each of these duplicate points, the mapping system can use a truncated signed distance function (TSDF) integration technique to reduce the amount of mapping data stored for an environment. The mapping system may also use other types of depth integration techniques, such as, but not limited to signed distance function (SDF) integration techniques.

In some examples, the environment to be mapped is divided into an array of cells that each represent a small portion of the world. According to some configurations, each of the cells is associated with global coordinates. Each cell is further divided into voxels. For example, a cell may be divided into (N×M×O) voxels, where N, M, and O are set to a positive value. The values of N, M, and O can be set to different values or the same value, depending on the particular application. In some cases, the accuracy of the sensor can be used to assist in determining the dimensions of the voxel. For example, the dimensions may be set smaller for more accurate sensors and larger for less accurate sensors.

After dividing the world, or a portion of the world, into cells and voxels, the mapping system collects range data for a portion of the environment. For example, a vehicle with range sensors (e.g. LIDAR) travels through the environment while collecting range data of the environment. Since the location of the vehicle within the environment can be determined (e.g., using GPS) and the locations of the range sensors on the vehicle is known, a global coordinate for a detected point can be determined.

In order to speed up the processing involving the large number range measurements, Graphics Processing Unit (GPU) memory, or some other type of high speed memory, can be used to store data relating to the mapping of the environment. In some configurations, the GPU stores an array of cells that are associated with the current portion of the world visible to the range sensors. For example, the mapping system maintains the cells associated with the current observable scene by the sensors located on the vehicle moving through the environment. As the vehicle moves, the cells that are no longer viewable by the sensors within the scene are swapped out of the GPU and replaced with cells that have come into view of the sensors.

In some configurations, the mapping system uses a TSDF based volumetric representation format to represent the environment. Generally, a TSDF based volumetric representation format represents a three dimensional environment in which voxels of a voxel grid stores a signed distance to the nearest surface. Using TSDF, a voxel may store a signed distance to the nearest surface. In the front of an object, the signed values are positive. Behind the object, the signed values are negative. This type of representation is widely used in other mapping techniques, such as RGB-D camera based environment mapping which include camera matrices, which are not available when using laser range sensors. As described herein, the TSDF depth integration technique to create a volumetric representation can be performed using input from multiple range finders (e.g., lasers range sensors). In some examples, the TSDF depth integration technique can also use input from other types of sensors (e.g., cameras) or other types of range sensing devices or imaging devices. In other examples, the mapping system can utilize the SDF depth integration technique.

Once cells are allocated within a memory, such as GPU memory, for the range data locations obtained by the sensors in the current view (or a previous view), the range measurements are integrated into the array of cells. For example, for a given measurement obtained from a sensor, a ray is projected from the sensor center to a point in front of the measured point through the measured point and a point behind the measured point, which defines a segment. The mapping system updates the TSDF of each voxel that intersects with the segment. The mapping results can then be visualized (e.g., using ray casting or marching cubes). More details are provided below with reference to FIGS. 1-7.

Figure 1:
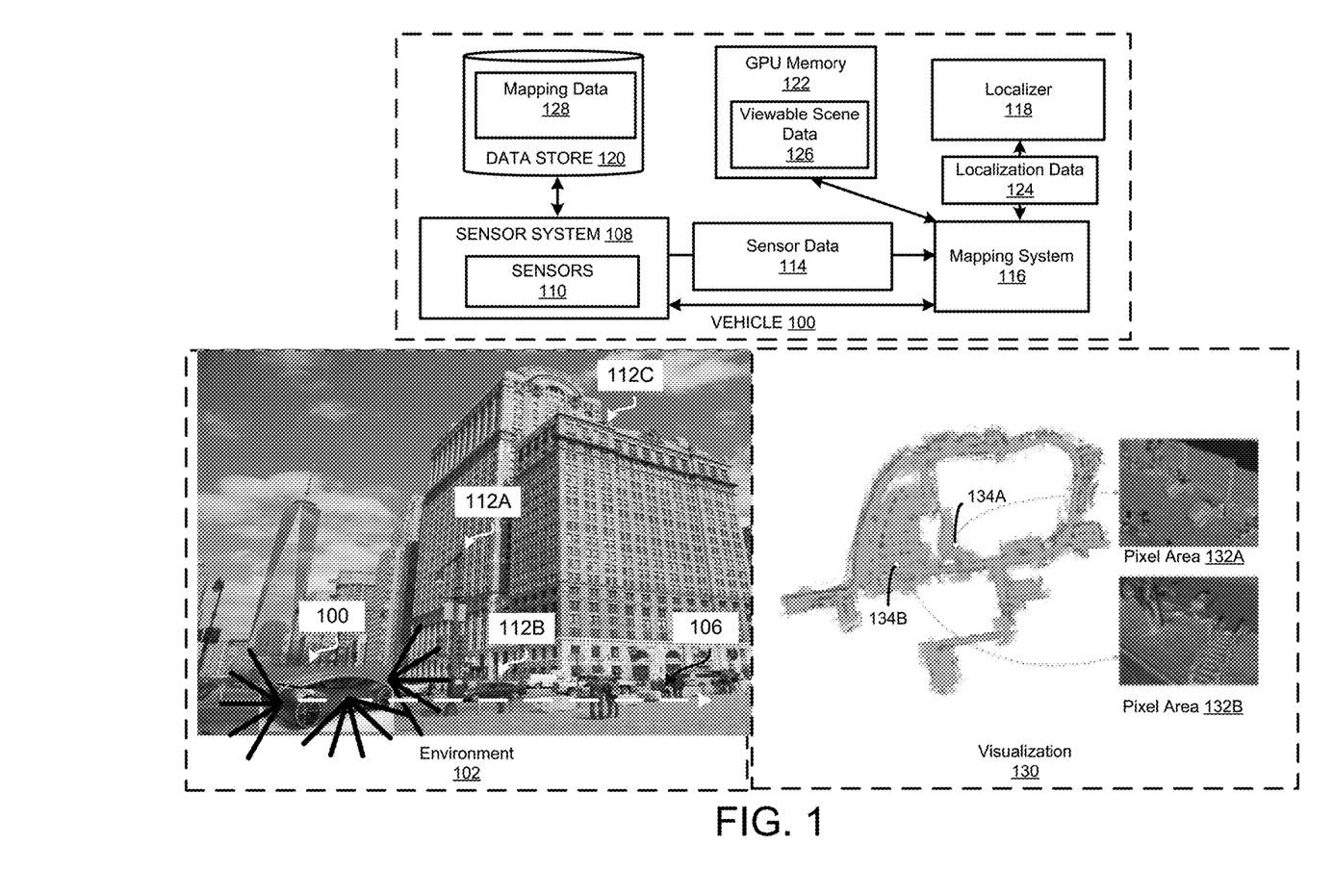
FIG. 1 is a system diagram depicting an illustrative operating environment for performing large scale dense mapping.

FIG. 1 is a system diagram depicting an illustrative operating environment for performing large scale dense mapping. In FIG. 1, a vehicle 100 is travelling through an environment 102 along a trajectory 106. Vehicle 100 includes a sensor system 108 that uses sensors 110 to sense (e.g., using passive and/or active sensors) the environment 102. In some examples, the sensors 110 include laser sensors that provide range data to a point on an object, such as object 112A, object 112B, and/or object 112C detected within the environment 102.

The sensor system 108 of vehicle 100 may provide sensor data 114 to mapping system 116. Generally, the mapping system 116 uses the sensor data 114 when performing the large scale dense mapping as described in more detail below. The sensor data 114 may include data representing a sensor signal (e.g., a signal generated by a sensor of the sensor system). The sensor data 114 may be indicative of the environment 102 external to the vehicle 100 (e.g., objects 112A-112C). In some examples, the sensor data 114 may include but is not limited to sensor data from LIDAR (e.g., 2D, 3D, color LIDAR), RADAR, stereo cameras, depth cameras, infrared sensors, photoelectric sensors, and ultrasonic sensors.

The localizer 118 may receive sensor data 114 from the sensor system 108, from the mapping system 116, or from some other component or device. The sensor data 114 used for localization may include but is not limited to global positioning system (GPS) data, inertial measurement unit (IMU) data, map data, route data, Route Network Definition File (RNDF) data, map tile data, and the like. Generally, the localizer 118 determines a location of the vehicle 100 and provides position and orientation data (e.g., a local position or local pose) to the mapping system 116 that may use the data to determine the global position of the vehicle 100. In some examples, the sensor system 108 of the vehicle 100 may include a global positioning system, an inertial measurement unit, or both.

Localizer 118 may process the sensor data 114, and optionally, other data, to generate position and orientation data, localization data 124 that may be used by the mapping system 116. The localization data 124 may include, but is not limited to, data representing a location of the vehicle 100 in the environment 102, GPS data, inertial measurement unit (IMU) data, map data, route data, Route Network Definition File (RNDF) data, odometry data, wheel encoder data, and map tile data, for example.

The systems of the vehicle 100 may include but are not limited to hardware, software, firmware, logic, circuitry, computer executable instructions embodied in a non-transitory computer readable medium, or any combination of the foregoing, to implement a sensor system 108, a mapping system 116, a localizer 118, or other systems (not illustrated) in FIG. 1. Vehicle 100 may include memory including but not limited to a mapping data store 119 that stores mapping data 122, CPU memory (not shown), GPU memory 124, that can be utilized by the mapping system 116.

As briefly described above, the mapping system 116 performs large scale dense mapping using data obtained from the sensors 110. In some configurations, as the vehicle 100 is moving along trajectory 106, the sensors 110 are scanning and obtaining sensor data 114. In the current example, the vehicle 100 is traveling along a street within a city. In some configurations, laser sensors 110 may perform a laser scan each 0.1 seconds (or faster or slower) producing between 1,000 to 100,000 range measurements. Generally, range finding sensors 110 can produce a large amount of sensor data 114 in a short amount of time. Further, the same point in the environment 102 can be detected many different times by different sensors 110 on the vehicle 100 and/or the same sensor at different points in time as the vehicle is traveling along the trajectory 106, or some other trajectory.

As the sensor data 114 is obtained by the sensors 110, the range measurements along with sensor pose information, and vehicle location information is stored. In some examples, this data and other sensor data 114 may be stored in GPU memory 122, the data store 122, CPU memory, or some other location. The sensor data 114 obtained from each sensor 110 can be stored alone or combined with the other range data obtained from different sensors.

As briefly discussed, the mapping system 116 may divide the environment 102 into an array of cells that are each associated with a small portion of the environment 102. Generally, the mapping system 116 divides the environment 102 into cells that are further divided into voxels. For example, each cell may be divided into (N×M×O) voxels, where N, M, and O are set to a positive value. The values of N, M, and O may be the same value or different values. In some examples, the values of N, M, and O are set to eight. In other examples, the values of N, M, and O are set to different values. More details are provided below with regard to FIG. 2.

After dividing the environment 102 into cells and voxels, the mapping system 116 collects sensor data 114 for a portion of the environment 102 that is within view of the sensors 110. For example, a vehicle with range sensors (e.g. LIDAR) moves through the environment while collecting range data of the environment. As the vehicle 100 moves within the environment 102, the localizer 118 may provide localization data 124 that indicates the location of the vehicle 100 within the environment 102. In some configurations, the mapping system 116 determines the global location for the vehicle. In other configurations, the localizer 118, or some other component, may determine the global location for the vehicle 100. Since the location of the vehicle 100 is known (e.g., using GPS) and the locations of the range sensors 110 on the vehicle are known, a global coordinate for a detected point by a sensor 110 can be determined.

In order to speed up the processing involving the large number range measurements, the GPU memory 122, or some other type of high speed memory, can be used to store data, such as viewable scene data 126. In some configurations, the GPU memory 122 stores an array of cells that are associated with the current portion of the world within which the vehicle 100 is moving. For example, the mapping system 116 identifies the cells associated with the current observable scene by the sensors 110. As the vehicle 110 moves, the cells that are no longer viewable by the sensors within the scene are swapped out of the GPU memory 122 and replaced with cells that have come into view of the sensors 110. In some configurations, cells that are not associated with range data are not initialized until a range measurement is associated with the cell. In this way, the memory includes cells that are associated with range data but does not include cells that do not have range data. Mapping data 128 that is not currently viewable may be stored in other locations, such as within the data store 120 and/or within some other memory, such as memory associated with a CPU utilized by the mapping system 116, or some other component or device. More details regarding the use of high speed memory are provided below with regard to FIG. 4. As discussed above, in some examples, the mapping system 116 uses a TSDF based volumetric representation format or an SDF based volumetric representation to represent the environment. Generally, once cells are allocated within the GPU memory 122 for the range measurements identified by the sensor data 114, the range measurements are integrated into TSDF based volumetric representation by the mapping system 116. For example, for a given measurement obtained from a sensor 110, the mapping system 116 projects a ray from the sensor center to a point in front of the measured point through the measured point and a point behind the measured point, which defines a segment. The mapping system 116 updates the SDF or TSDF of each voxel that intersects with the segment. More details are provided below with regard to FIG. 3. After generating the SDF or TSDF volumetric representation, the mapping manager 116 can generate a visualization, such as visualization 130. In some configurations, the mapping system 116 uses ray casting or marching cubes to generate the visualization. The visualization 130 is an exemplary mapping result for a very large scale outdoor scene obtained from over 37,000 laser scans using eight 16-beams LiDAR VLP-16 laser sensors. Pixel level area 132A and 132B illustrate a three-dimensional visualization using the data obtained from location 134A and location 134B.

Figure 2:
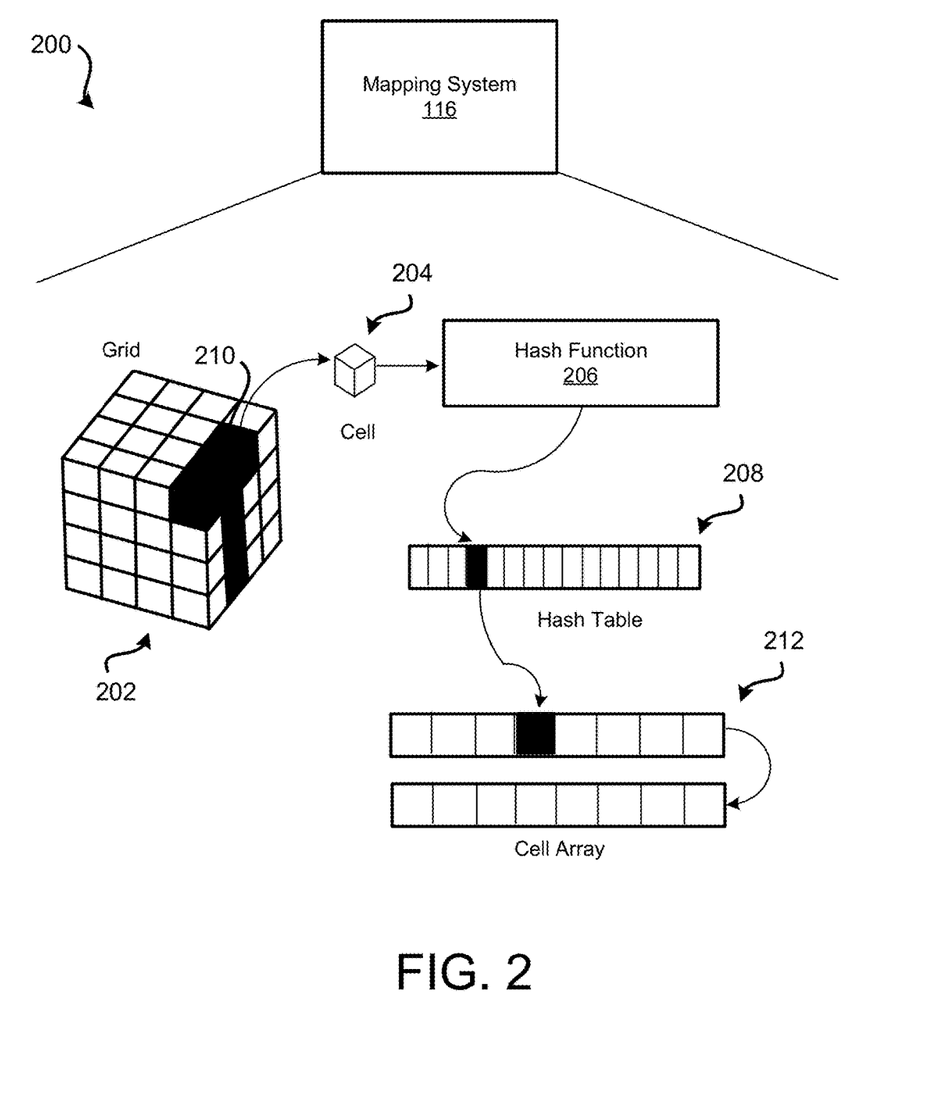
FIG. 2 illustrates generating a sparse volumetric representation of an environment.

FIG. 2 illustrates generating a sparse volumetric representation of an environment. In some examples, the mapping system 116 generates the sparse volumetric representation 200.

As discussed above, the mapping manager 116, or some other component or device, divides the world, or a portion of the world, into one or more grids 202. In some configurations, a user may specify how to divide the environment. For example, a user may specify the size of the cells and/or voxels. The grids 202 are further divided into cells, such as cell 204. In some examples, each of the cells within the grid 202 represents a small portion of the world (e.g., 50 meters× 50 meters×50 meters). Each cell is further divided into voxels. For example, a cell may be divided into (N×M×O) voxels, where N, M, and O are set to a positive value. The value of N, M, and O can be set to the same value or different values (e.g., 4-50), depending on the particular application. In some cases, the accuracy of the sensor may be used when determining the dimensions of the voxel. For example, the dimensions for a laser sensor, such as LIDAR, may be larger compared to the dimensions for a time-of-flight camera.

A hash function 206 can be used to map a particular cell, such as cell 204, the cell array 212. Mapping system 116 applies the hash function 206 to determine the entry for the cell in the hash table 208.

As illustrated in FIG. 2, the group of cells 210 which are shown as black contain range data, whereas the other cells within the grid 202 that are shown as white are empty cells that do not include range data. In some configurations, cells within the cell array 212 are not allocated into memory by the mapping system 116 until a range measurement is associated with at least one of the voxels within a cell. Not allocating the cells until a range measurement is associated with at least one of the voxels can save significantly on memory use by the mapping system 116. In the current example, the cells 210 that include range measurement have cells within the cell array 212 allocated, whereas the cells that do not include a range measurement within the grid 202 do not have memory allocated within the cell array 212.

Each cell in the grid 202 that is associated with a measurement is linked to a cell within the cell array 212 that may be stored in the GPU memory 122, by use of the hash table 208 that holds the index and the location of the cell within the cell array 212. In some configurations, the cells include range measurements located within some distance of a detected surface.

In some configurations, each voxel (not shown) associated with a cell can store a TSDF value S that represents the distance from the detected object, a weight W and a color value C (which can be either intensity or RGB value). The value S, weight W, and the color value C can be determined from one range measurement or multiple range measurements. Further, the range measurements can be obtained from one range sensing device to multiple sensing devices of the same type or a different type. Instead of storing multiple values relating to different sensed range values for a voxel, each voxel only stores a single value S, W, and C. As discussed in more detail below, the values related to a voxel can be averaged, or filtered in some other way, in order to determine the S, W, and C values.

Figure 3A:
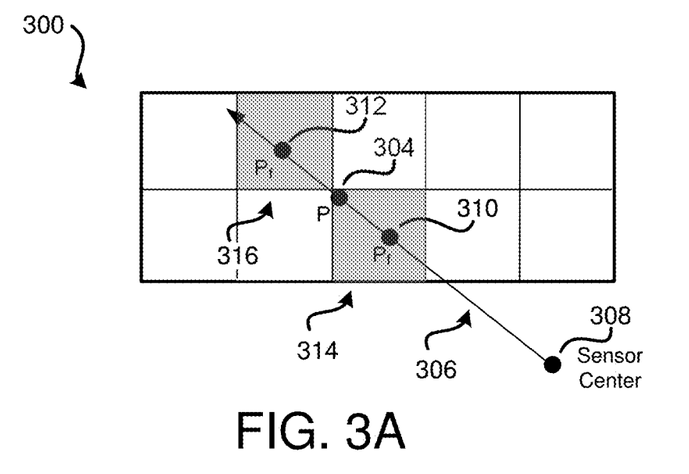
FIG. 3A shows an example of cell allocation.

FIG. 3A shows an example of a cell allocation 300. As illustrated, FIG. 3A shows two cells intersected by a ray projected from a sensor center through point 304. Given a measurement (point 304) from a sensor 110, the mapping system 116 protects a ray 306 from the sensor center 308 and through the point 310 and point 312. In some configurations, a ray 306 is projected for each range measurement obtained from the sensors 110.

In some configurations, the mapping system 116 performs a search along the segment of the ray 306 from point 310 to point 312 and determines the cells that are intersected by the ray. In the current example, cell 314 and cell 316 (shown as grey) intersect with the segment. If the cells that intersect within the segment have not been allocated within memory, such as the GPU memory 122, the mapping system 116 allocates the memory.

Since the mapping system 116 knows the pose of each of the sensors 110 in each frame, the mapping system 116 can determine which cells within the grid 202 to allocate. Once the cells are allocated for the range data locations identified in the current frame, the depth measurements are integrated into the grid 202.

Figure 3B:
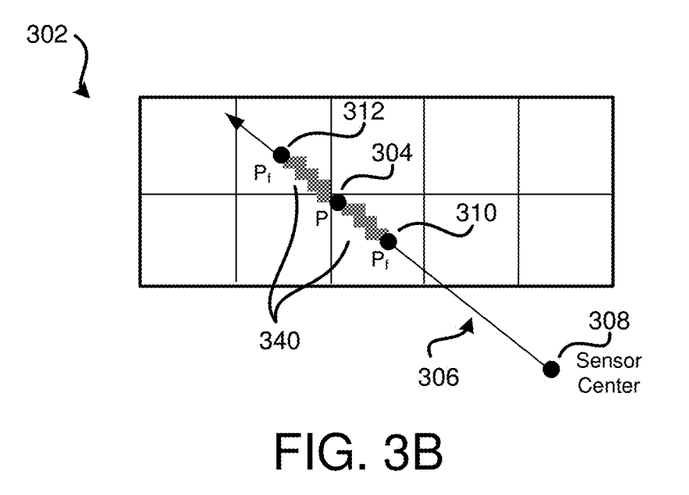
FIG. 3B shows an example of cell depth integration.

FIG. 3B shows an example 302 for updating voxels within the cells using range data.

As described briefly above, the mapping system 116 updates the voxels using the range data obtained by the sensors 110. In some configurations, after determining the cells that intersect with the segment, the mapping system 116 identifies the voxels within each of the intersected cells to update (e.g., voxels 340 indicated in black shading). Generally, the voxels that are updated include any voxels within a cell in which ray 306 intersects. As described above and indicated in FIG. 3B, voxels 340 may be voxels that intersect the segment of ray 306 (which, as indicated in FIG.

3B, may have a length that is less than a portion of the ray 306 that intersects the cells). According to some examples, the mapping system 116 updates a voxel to include a signed distance (s) from the surface, a weight w and color value c associated with the range measurement (point 304).

In some configurations, in each frame, the mapping system 116 defines a minimum starting coordinate and a maximum coordinate that the sensor can sense as the sensor frame. In these configurations, mapping takes place within this area. According to some examples, the maximum X, Y, and Z values are set to larger numbers than the maximum range of the sensor being used. For instance, the range can vary from a few meters (e.g. 5 meters for time-of-flight cameras), to hundreds of meters (e.g. 200 meters for the laser). The index of the sensor frame increases or decreases by 1 in each dimension, as the sensor moves distance in each dimension. The maximum numbers of voxels and cells in each dimension of the sensor frame can be expressed as:

$Nv=(Vmax-Vmin)/\text{Voxel Dimension}$ $N\_Cell=(Vmax-Vmin)/(\text{Voxel Size}*\text{Voxel Dimension})$ Given the pose of the range finding sensor 110, Ps=(x, y, z) of a voxel v in the sensor frame, the index of the voxel Iv and the index of the cell IC that the voxel v belongs can be computed as: Iv=Nv(Ps−Vmin)/(Vmax−Vmin); and IC=NC (Ps−Vmin)=(Vmax−Vmin). Meanwhile, a cell C in the grid 202 has a unique index Is in the sensor frame: Is=ICx+NCx(ICy+NCyICz).

As briefly discussed, previous techniques of dense reconstruction using TSDFs generally use depth images. When using depth images, each pixel is transformed into a three dimensional point. This transformation requires unprojecting using a camera matrix. The projected point from the depth image is then transformed into an appropriate coordinate system, such as that of the TSDF, and subsequently fused into the TSDF to provide information about any detected surfaces. As opposed to the use of depth maps, the use of range sensors to generate depth information does not require a camera matrix, nor an unprojection operation, as the data from range sensors is generally a coordinate in three dimensions. As in the depth camera, this three dimensional data from the range sensor, is then transformed into an appropriate coordinate system and then fused into the SDF (or TSDF).

Figure 4:
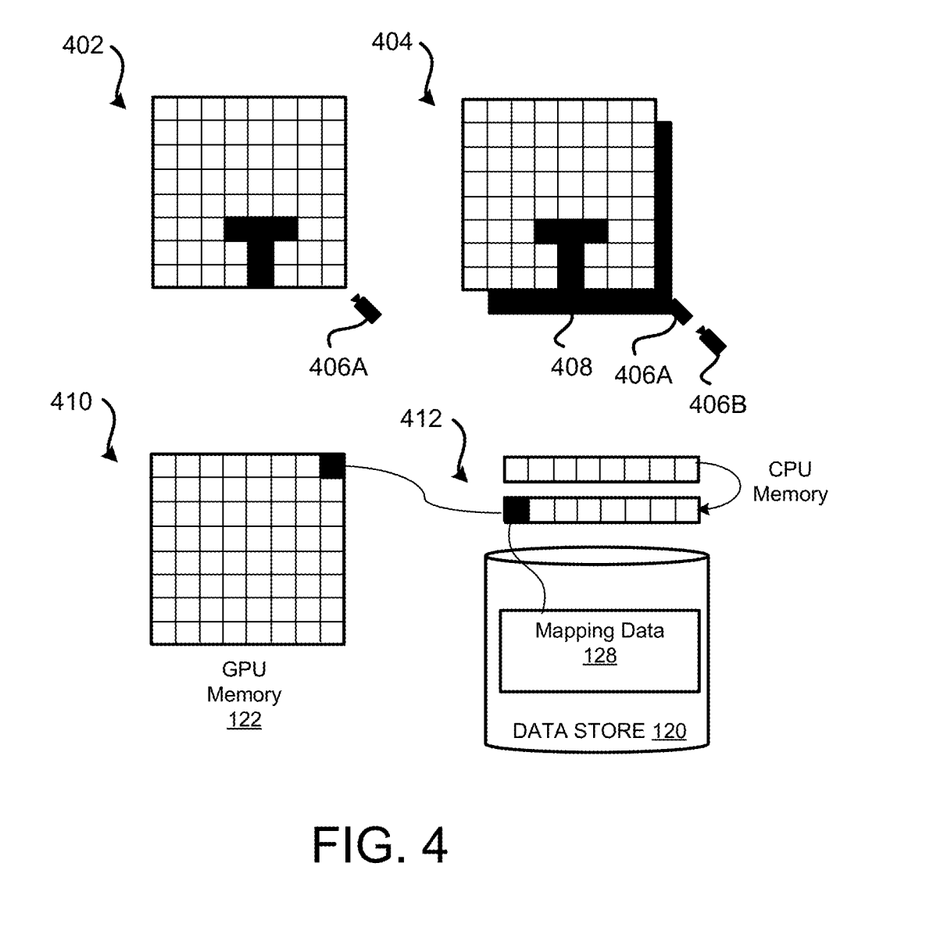
FIG. 4 illustrates swapping cell data between Graphics Processing Unit (GPU) memory, CPU memory and disk memory.

FIG. 4 illustrates swapping cell data between Graphics Processing Unit (GPU) memory, CPU memory and disk memory. In the current example, an initial frame 402, a subsequent frame 404, a representation 410 of GPU memory 122, a representation 412 of CPU memory, and data store 120 is illustrated.

Frame 402 shows an initial sensor pose with black indicating the current observable scene by a sensor 110 at location 406A. Frame 404 illustrates as the sensor 110 moves from location 406A to location 406B, resulting in cell 408 (shown as dark gray) out of the current observable scene by the sensor. The GPU memory 122 corresponding to cells of the previous scene which are not visible from the current sensor pose are shown as light gray in frame 404.

In some configurations, the cell 408 is swapped by the mapping system 116 from the GPU memory 122 to the CPU memory array as illustrated by element 408 and element 410. According to some examples, when the CPU memory array is full, the mapping system 116 swaps the cell into the data store 120 as mapping data 128. In some configurations, the mapping system 116 can obtain mapping data 128 from either the data store 120 or the CPU memory when a scene is revisited by a sensor and place the data back into the GPU memory 122.

Figure 5:
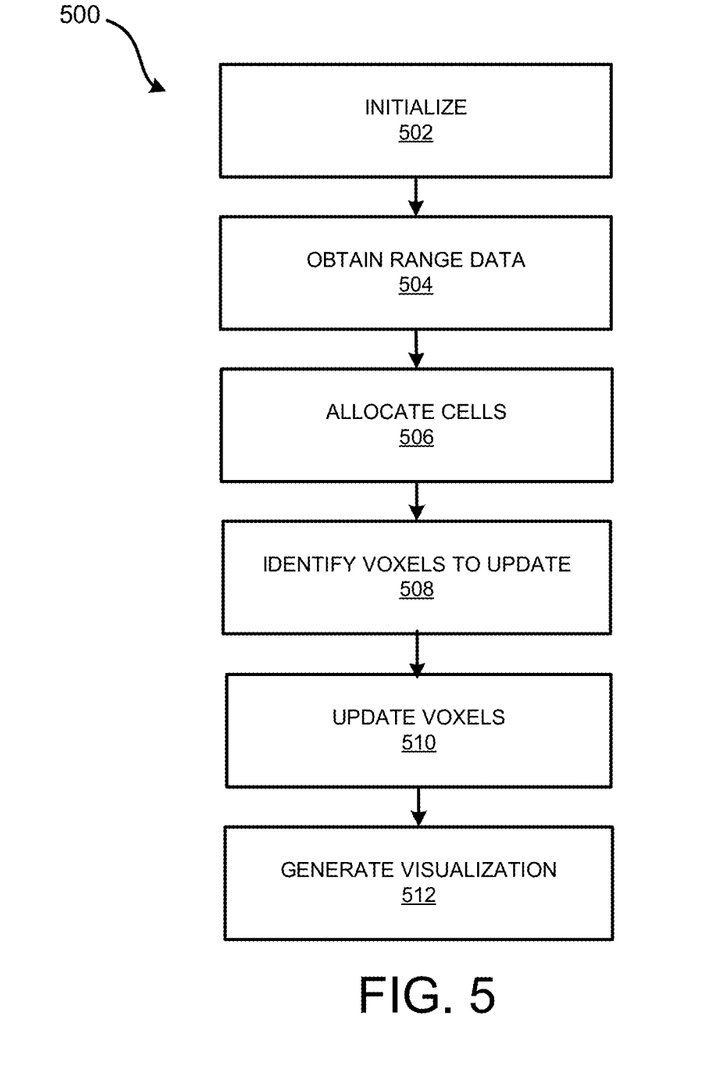
FIG. 5 is a flow diagram showing a routine illustrating aspects of a mechanism disclosed herein for large scale dense mapping.
Figure 6:
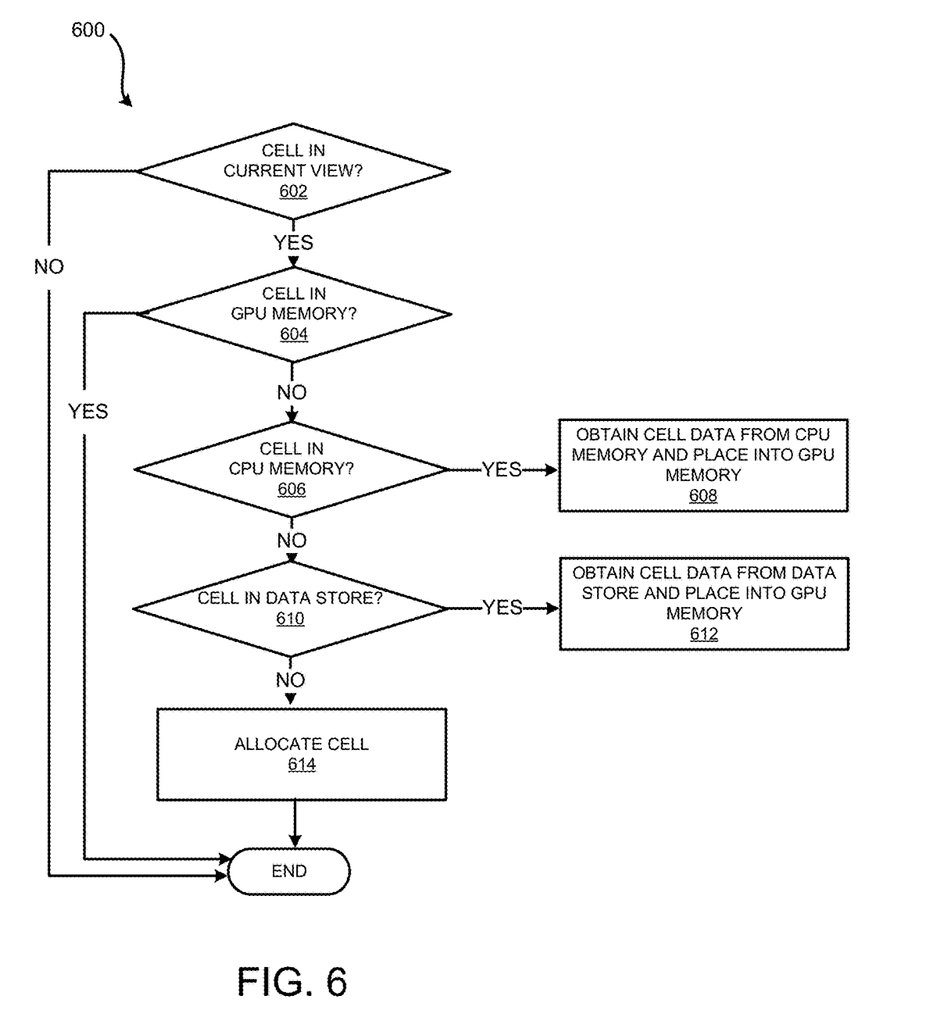
FIG. 6 is a flow diagram showing a routine illustrating aspects of a mechanism disclosed herein for swapping cells in and out of high speed memory.

FIGS. 5-6 are flow diagrams showing routines that illustrate aspects of large scale dense mapping using range data. It should be appreciated that the logical operations described herein with respect to FIGS. 5, and 6, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 5 is a flow diagram showing a routine 500 illustrating aspects of a mechanism disclosed herein for large scale dense mapping. The routine may begin at 502, where the mapping system is initialized. As discussed above, in some examples, the environment to be mapped is divided into cells and voxels by the mapping system 116, or by some other device or component. In some configurations, the available GPU memory 122 is initialized by the mapping system 116 to include an array that is to be associated with cells of the environment 102.

At 504, range data is obtained. As discussed above, the sensor system 108 may receive sensor data 114 from one or more sensors 110. In some examples, the sensor data 114 is range data generated by LIDAR sensors. In other examples, the sensor data 114 can include other types of sensor data, such as stereo cameras, depth cameras, infrared sensors, photoelectric sensors, ultrasonic sensors, and the like.

At 506, one or more cells are allocated by the mapping system 116. As discussed above, a cell is allocated after a range measurement associated with a particular cell is obtained from one or more of the sensors 119. Generally, the mapping system 116 determines whether or not to allocate a cell based on whether the cell intersects with a ray projected from the sensor center through the range measurement. If the cell has not already been initialized, the mapping system 116 allocates the cell and creates a hash entry for the cell. When the cell has already been initialized (a previous range measurement corresponds to the cell) the mapping system 116 does not allocate the cell.

At 508, the voxels to update within one or more cells are identified. As discussed above, once the cells associated with a particular range measurement identified from the sensor data 110, the voxels that intersect the ray segment are identified.

At 510, the voxels that intersect the ray segment are updated by the mapping system 116 to reflect the range information received from a sensor. As discussed above, when the voxel does not have a current value, the voxel is updated with a signed distance. When the identified voxel already has a value, the value within the voxel can be averaged with the new value and/or some other function might be performed (e.g., filtering).

At 512, a visualization of the volumetric representation, such as a TSDF or SDF volumetric representation may be generated. As discussed above, the mapping system 116 may use ray casting, marching cubes, or some other visualization technique to generate the visualization.

FIG. 6 is a flow diagram showing a routine 600 illustrating aspects of a mechanism disclosed herein for swapping cells in and out of high speed memory. The routine may begin at 602, where a determination is made by the mapping system 116, or some other component or device as to whether a cell associated with a range measurement is within a current view of the sensors 110. When the cell is not in the current view, the process 600 moves to an end operation. When the cell is in the current view, the process 600 moves to 604.

At 604, a determination is made as to whether the cell is already in the high speed memory. As discussed above, the mapping manager 116 may store the cells associated with the current view of the sensors 110 within a high speed memory, such as GPU memory, in order to more quickly process the range measurements. When the cell is not in the GPU memory, the process 600 moves to 606. When the cell is in the GPU memory 122, the process 600 moves to an end operation.

At 606, a determination is made as to whether the cell is located within CPU memory. As discussed above, the mapping manager 116 may store the cells associated with the current view within GPU memory, a portion of the cells that do not fit within the GPU memory within CPU memory, and another portion of the cells within a data store, such as a hard disk. When the cell is in the CPU memory, the process 600 moves to 608 where the cell is obtained from the CPU memory and placed into the GPU memory 122. When the cell is not in the CPU memory, the process 600 moves to 610.

At 610, a determination is made as to whether the cell is located within a data store. When the cell is in the data store, the process 600 moves to 612 where the cell is obtained from the data store and placed into the GPU memory 122. When the cell is not in the data store, the process 600 moves to 614 where the cell is allocated.

Figure 7:
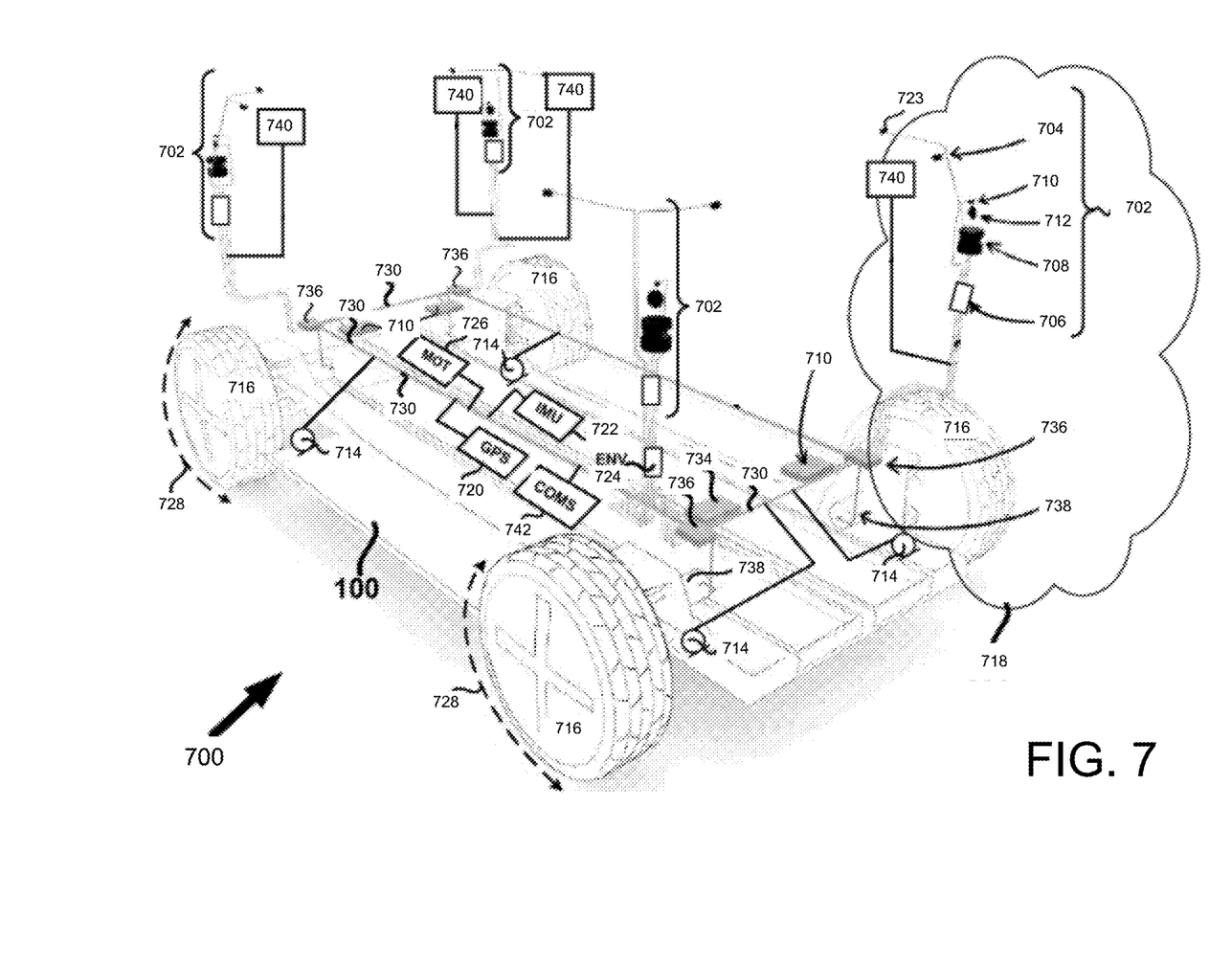
FIG. 7 is a diagram of vehicle that includes systems for use in large scale dense mapping that might be utilized to implement aspects of the various examples presented herein.

FIG. 7 is a diagram of vehicle 100 that includes systems for use in large scale dense mapping using range data. In FIG. 7, the vehicle 100 may include a suite of sensors 702 positioned at one or more locations on the vehicle 100. Each suite of sensors 702 may have sensors including but not limited to LIDAR 704 (e.g., color LIDAR, three-dimensional color LIDAR, two-dimensional LIDAR, etc.), an image capture device 706 (e.g., a digital camera), RADAR 708, a microphone 710 (e.g., to capture ambient sound), and a loudspeaker 712 (e.g., to greet/communicate with passengers of the vehicle 100). Microphones 714 (e.g., to may be configured to capture sound from drive system components such as propulsion systems and/or braking systems) and may be positioned at suitable locations proximate to drive system components to detect sound generated by those components, for example.

Each suite of sensors 702 may include more than one of the same types of sensor, such as two image capture devices 706, or microphone 714 positioned proximate to each wheel 716, for example. Microphone 714 may be configured to capture audio signals indicative of drive operations of the vehicle 100. Microphone 710 may be configured to capture audio signals indicative of ambient sounds in the environment external to the vehicle 100. Multiple microphones 710 may be paired or otherwise grouped to generate signals that may be processed to estimate sound source location of sounds originating in the environment 718, for example. Vehicle 100 may include sensors for generating data representing location of the vehicle 100, and those sensors may include but are not limited to a global positioning system (GPS) 720 and/or an inertial measurement unit (IMU) 722.

Vehicle 100 may include one or more sensors ENV 724 for sensing environmental conditions in the environment external to the vehicle 100, such as air temperature, air pressure, humidity, barometric pressure, etc. vehicle 100 may include one or more sensors MOT 726 configured to detect motion of the vehicle 100 (e.g., motion due to an impact from a collision, motion due to an emergency/evasive maneuvering, etc.). As one example, sensor MOT 726 may include but is not limited to an accelerometer, a multi-axis accelerometer and a gyroscope.

Vehicle 100 may include one or more rotation sensors (not shown) associated with wheels 716 and configured to detect rotation 728 of the wheel 716 (e.g., a wheel encoder). For example, each wheel 716 may have an associated wheel encoder configured to detect rotation of the wheel 716 (e.g., an axle of the wheel 716 and/or a propulsion component of the wheel 716, such as an electric motor, etc.). Data representing a rotation signal generated by the rotation sensor may be received by one or more systems of the vehicle 100, such as the planner system, the localizer system, the perception system, the drive system, and one or more of the safety systems, for example.

A communications network 730 may route signals and/or data to/from sensors, one or more safety systems 732 (e.g., a bladder, a seat actuator, a seat belt tensioner), and other components of the vehicle 100, such as one or more processors 734 and one or more routers 736, for example. Routers 736 may route signals and/or data from: sensors in sensors suites 702, one or more acoustic beam-steering arrays (not shown) (e.g., one or more of a directional acoustic source, a phased array, a parametric array, a large radiator, of ultrasonic source), one or more light emitters, between other routers 736, between processors 734, drive operation systems such as propulsion (e.g., electric motors 738), steering, braking, one or more safety systems 740, etc., and a communications system 742 (e.g., for wireless communication with external systems and/or resources).

One or more processors 710 may be used to implement one or more of the systems of the vehicle 100, for example. One or more processors 710 may be configured to execute algorithms embodied in a non-transitory computer readable medium, to implement one or more of the systems of the vehicle 100, for example. The one or more processors 710 may include but are not limited to circuitry, logic, field programmable gate array (FPGA), application specific integrated circuits (ASIC), programmable logic, a digital signal processor (DSP), a graphics processing unit (GPU) associated with GPU memory, a microprocessor, a microcontroller, a big fat computer (BFC) or others, or clusters thereof.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, mobile telephone devices, tablet computing devices, special-purposed hardware devices, network appliances and the like.

Based on the foregoing, it should be appreciated that technologies for large scale dense mapping using range data have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A computer-implemented method, comprising:
    determining an array of cells to represent, in a signed distance function (SDF) volumetric representation, at least a portion of an environment;
    obtaining sensor data representative of the environment from one or more sensors on a system, a sensor of the one or more sensors including a sensor center;
    determining a ray originating at the sensor center and passing through a point associated with the sensor data;
    determining a segment along the ray within a distance, d, of the point, the segment having a length that is less than a portion of the ray traversing the SDF volumetric representation;
    identifying one or more cells, of the array, intersected by the segment, each cell of the one or more cells comprising a plurality of voxels;
    determining a hash entry for at least a portion of the one or more cells;
    allocating memory for each of the one or more cells; and
    updating, within the memory and using at least a portion of the sensor data, cell data associated with the one or more cells to update the SDF volumetric representation.

2. The computer-implemented method of claim 1, wherein updating the cell data associated with the one or more cells comprises:
    determining a first set of voxels associated with the one or more cells, of the array, intersected by the segment; and
    for each voxel of the first set of voxels, updating a respective signed distance value associated with the respective voxel to reflect a distance associated with an object in the environment;
    wherein, for each voxel of a second set of voxels along the ray, a respective signed distance value associated with the respective voxel is maintained.

3. The computer-implemented method of claim 1, wherein obtaining the sensor data comprises obtaining range data from one or more light detection and ranging (LIDAR) sensors and wherein the SDF volumetric representation is a truncated SDF volumetric representation.

4. The computer-implemented method of claim 1, wherein the one or more sensors comprise a GPS sensor or an inertial measurement unit (IMU), the method further comprising:
    determining, based at least in part on the sensor data and the SDF volumetric representation, a location of the system or a movement of the system,
    wherein the memory comprises graphics processor unit (GPU) memory, and the method further comprises swapping out at least a portion of the cell data associated with one or more of the cells of the SDF volumetric representation stored within the GPU memory with data stored in central processor unit (CPU) memory based, at least in part, on the location of the system or the movement of the system.

5. The computer-implemented method of claim 1, further comprising:
    generating a visualization of the SDF volumetric representation; and
    controlling an autonomous vehicle based at least in part on the visualization.

6. The computer-implemented method of claim 1, wherein the memory comprises a first memory accessible to a graphics processing unit (GPU), the method further comprising:
    determining that the sensor center has moved;
    determining a first set of the one or more cells are no longer in a current view of the sensors;
    copying first data associated with the first set from the first memory to a second memory, the second memory comprising memory accessible to a central processing unit (CPU);
    determining a second set of the one or more cells is in a current view of the one or more sensors and is stored in the second memory; and
    copying second data associated with the second set of the one or more cells from the second memory to the first memory.

7. The computer-implemented method of claim 6, the method further comprising:
    localizing an autonomous vehicle based, at least in part, on the sensor data; and
    determining the sensor center based, at least in part, on the localizing.

8. The computer-implemented method of claim 6, the method further comprising:
    determining that a capacity of the second memory exceeds a threshold;
    copying third data from the second memory to file storage;
    freeing a portion of the second memory associated with the third data; and
    copying fourth data from the file storage to the second memory, wherein the third data is associated with a third set of cells, and wherein the fourth data is associated with a fourth set of cells.

9. The computer-implemented method of claim 1, wherein identifying the one or more cells, of the array, that intersect the segment comprises stepping along the segment of the ray in steps having a size equal to a voxel size.

10. A system, comprising:
    a first memory accessible to a graphics processing unit (GPU) operative to store data associated with a signed distance function (SDF) volumetric representation of at least a portion of an environment;

a sensor operative to obtain sensor data representative of the portion of the environment, wherein the sensor has a sensor center and the sensor data includes range measurements identifying points in a three dimensional space; and one or more processors configured to:
obtain, from the sensor, a range measurement identifying a point in the three dimensional space;
identify one or more cells associated with the first memory and intersected by a segment of a ray originating from the sensor center and passing through the point, the segment being within a distance, d, of the point, and the segment having a length that is less than a portion of the ray traversing the SDF volumetric representation;
determine a hash entry for at least a portion of the one or more cells;
allocate one or more portions of the first memory for each of the one or more cells; and
update, in the first memory and based at least in part on the range measurement, the one or more cells.

11. The system of claim 10, wherein, to update the one or more cells, the one or more processors are configured to update a signed distance value of one or more voxels associated with the one or more cells based, at least in part, on the range measurement.

12. The system of claim 10, wherein the sensor comprises one or more light detection and ranging (LIDAR) sensors and one or more other types of sensors that are operative to provide range measurements, and
wherein localizing the system comprises determining one or more of a position or orientation of the system based at least in part on the one or more LIDAR sensors.

13. The system of claim 10, wherein the one or more processors are further configured to determine cells associated with a current view of the sensor and store data associated with at least a portion of cells within the first memory accessible to the GPU.

14. The system of claim 10, the one or more processors further configured to:
localize an autonomous vehicle based, at least in part, on the sensor data; and
determine the sensor center based, at least in part, on the localizing.

15. The system of claim 10, the one or more processors further configured to:
localize the sensor in the environment;
determine, based at least on the localization, that the sensor has moved relative to the SDF volumetric representation;
based at least in part on determining that the sensor has moved, copy a portion of the first memory to a second memory, the second memory accessible by a central processing unit (CPU); and
based at least in part on the determination that the sensor has moved, copy a portion of the second memory to the first memory.

16. The system of claim 15, the one or more processors further configured to:
determine that a capacity of the second memory exceeds a threshold;
copy third data from the second memory to file storage;
free a portion of the second memory associated with the third data; and
copy fourth data from the file storage to the second memory.

17. A non-transitory computer-readable storage medium having computer-executable instructions stored thereupon which, when executed by a computer, cause the computer to:
obtain, from a sensor, sensor data comprising a range measurement identifying a point in three dimensional space of an environment;
identify one or more cells, of an array of cells, intersected by a first portion of a ray passing from a sensor center to the point, wherein:
the array of cells is associated with a signed distance function (SDF) volumetric representation of at least a portion of the environment;
the first portion of the ray is within a distance, d, of the point; and
the first portion of the ray has a length that is less than a second portion of the ray traversing the SDF volumetric representation;
determine that at least a portion of the one or more cells has not been initialized;
determine a hash entry for the at least the portion of the one or more cells;
allocate first memory for each of the one or more cells; and
update, in the first memory and based at least in part on the range measurement, at least a portion of cell data associated with the one or more cells for at least a portion of the environment.

18. The non-transitory computer-readable storage medium of claim 17, wherein:
to update at least a portion of cell data associated with the one or more cells, the computer-executable instructions cause the computer to:
update a distance value of one or more voxels associated with the cell based, at least in part, on the range measurement; and
the computer-executable instructions further cause the computer to:
generate a command configured to control an autonomous vehicle, the command based, at least in part, on the SDF volumetric representation; and
transmit the command to an autonomous vehicle.

19. The non-transitory computer-readable storage medium of claim 17, wherein the sensor comprises one or more light detection and ranging (LIDAR) sensors and one or more other types of sensors that are operative to provide range measurements.

20. The non-transitory computer-readable storage medium of claim 17, wherein the computer-executable instructions further cause the computer to:
determine, based at least in part on the sensor data, that the sensor has moved within the environment;
responsive to the determination that the sensor has moved within the environment, copy the first memory to a second memory, wherein the first memory is memory accessible by a graphics processing unit (GPU) and the second memory is memory accessible by a central processing unit (CPU); and
generate a visualization of the SDF volumetric representation.

* * * * *